(12) United States Patent
Anders et al.

(10) Patent No.: US 11,063,949 B2
(45) Date of Patent: *Jul. 13, 2021

(54) DYNAMIC SOCIALIZED COLLABORATION NODES

(71) Applicant: International Business Machines Corporation, Armonk, NY (US)

(72) Inventors: Kelley Anders, East New Market, MD (US); Jonathan Dunne, Dungarvan (IE); Liam S. Harpur, Dublin (IE); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,839

(22) Filed: Aug. 23, 2019

(65) Prior Publication Data
US 2020/0099688 A1    Mar. 26, 2020

Related U.S. Application Data

(63) Continuation of application No. 16/136,420, filed on Sep. 20, 2018.

(51) Int. Cl.
*H04L 29/06*    (2006.01)
*G06N 20/00*    (2019.01)
(Continued)

(52) U.S. Cl.
CPC .......... *H04L 63/10* (2013.01); *G06F 16/285* (2019.01); *G06F 40/30* (2020.01); *G06N 20/00* (2019.01); *G06Q 50/01* (2013.01)

(58) Field of Classification Search
CPC ... H04L 63/10; G06N 99/005; G06F 17/2785; G06F 17/30598; G06Q 50/01
(Continued)

(56) References Cited

U.S. PATENT DOCUMENTS

2015/0332283 A1   11/2015   Witchey
2017/0161439 A1   6/2017   Raduchel et al.
(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Evans Desrosiers
(74) *Attorney, Agent, or Firm* — Maeve Carpenter; George S. Blasiak; Heslin Rothenberg Farley & Mesiti PC

(57) ABSTRACT

Methods, computer program products, and systems are presented. The method computer program products, and systems can include, for instance: examining ledger data of a blockchain ledger; examining node data of a plurality of candidate nodes, wherein the examining node data includes examining data of candidate nodal networks associated to respective ones of the plurality of candidate nodes; and transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes.

20 Claims, 10 Drawing Sheets

(51) Int. Cl.
*G06F 16/28* (2019.01)
*G06F 40/30* (2020.01)
*G06Q 50/00* (2012.01)

(58) Field of Classification Search
USPC .............................................................. 726/3
See application file for complete search history.

(56) References Cited

U.S. PATENT DOCUMENTS

2017/0301033 A1    10/2017  Brown et al.
2018/0225693 A1*   8/2018   Postrel ............... G06Q 30/0214
2019/0180266 A1*   6/2019   Sidhu ................. G06Q 20/3829

OTHER PUBLICATIONS

List of IBM Patent and/or Patent Applications treated as related for U.S. Appl. No. 16/549,839, filed Aug. 23, 2019, Dated Aug. 23, 2019.
Non-Final Rejection, U.S. Appl. No. 16/136,420, filed Sep. 20, 2018, dated Sep. 1, 2020.
Response to Non-Final Rejection, U.S. Appl. No. 16/136,420, filed Sep. 20, 2018, dated Nov. 25, 2020.
Final Rejection, U.S. Appl. No. 16/136,420, filed Sep. 20, 2018, dated Dec. 22, 2020.
Applicant's Response to Final Rejection, U.S. Appl. No. 16/136,420, filed Sep. 20, 2018, dated Feb. 25, 2021.
Notice of Allowance, U.S. Appl. No. 16/136,420, filed Sep. 20, 2018, dated Mar. 10, 2021.

* cited by examiner

DYNAMIC SOCIALIZED COLLABORATION NODES

CROSS-REFERENCE TO RELATED APPLICATION

This application is a continuation of U.S. application Ser. No. 16/136,420, filed Sep. 20, 2018, titled "Dynamic Socialized Collaboration Nodes", which is incorporated by reference herein in its entirety.

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining ledger data of a blockchain ledger; examining node data of a plurality of candidate nodes, wherein the examining node data includes examining data of candidate nodal networks associated to respective ones of the plurality of candidate nodes; and transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes.

In another aspect, a computer program product can be provided. The computer program product can include a computer readable storage medium readable by one or more processing circuit and storing instructions for execution by one or more processor for performing a method. The method can include, for example: examining ledger data of a blockchain ledger; examining node data of a plurality of candidate nodes, wherein the examining node data includes examining data of candidate nodal networks associated to respective ones of the plurality of candidate nodes; and transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes.

In a further aspect, a system can be provided. The system can include, for example a memory. In addition, the system can include one or more processor in communication with the memory. Further, the system can include program instructions executable by the one or more processor via the memory to perform a method. The method can include, for example: examining ledger data of a blockchain ledger; examining node data of a plurality of candidate nodes, wherein the examining node data includes examining data of candidate nodal networks associated to respective ones of the plurality of candidate nodes; and transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes.

Shortcomings of the prior art are overcome, and additional advantages are provided, through the provision, in one aspect, of a method. The method can include, for example: examining ledger data of a blockchain ledger; examining node data of a plurality of candidate nodes; and transitioning blockchain ledger access in dependence on the examining of the ledger data and the node data, wherein the transitioning blockchain ledger access includes transitioning blockchain ledger access to a certain node of the plurality of candidate nodes.

In another aspect, a computer program product can be provided. The computer program product can include a computer readable storage medium readable by one or more processing circuit and storing instructions for execution by one or more processor for performing a method. The method can include, for example: examining ledger data of a blockchain ledger; examining node data of a plurality of candidate nodes; and transitioning blockchain ledger access in dependence on the examining of the ledger data and the node data, wherein the transitioning blockchain ledger access includes transitioning blockchain ledger access to a certain node of the plurality of candidate nodes.

In a further aspect, a system can be provided. The system can include, for example a memory. In addition, the system can include one or more processor in communication with the memory. Further, the system can include program instructions executable by the one or more processor via the memory to perform a method. The method can include, for example: examining ledger data of a blockchain ledger; examining node data of a plurality of candidate nodes; and transitioning blockchain ledger access in dependence on the examining of the ledger data and the node data, wherein the transitioning blockchain ledger access includes transitioning blockchain ledger access to a certain node of the plurality of candidate nodes.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
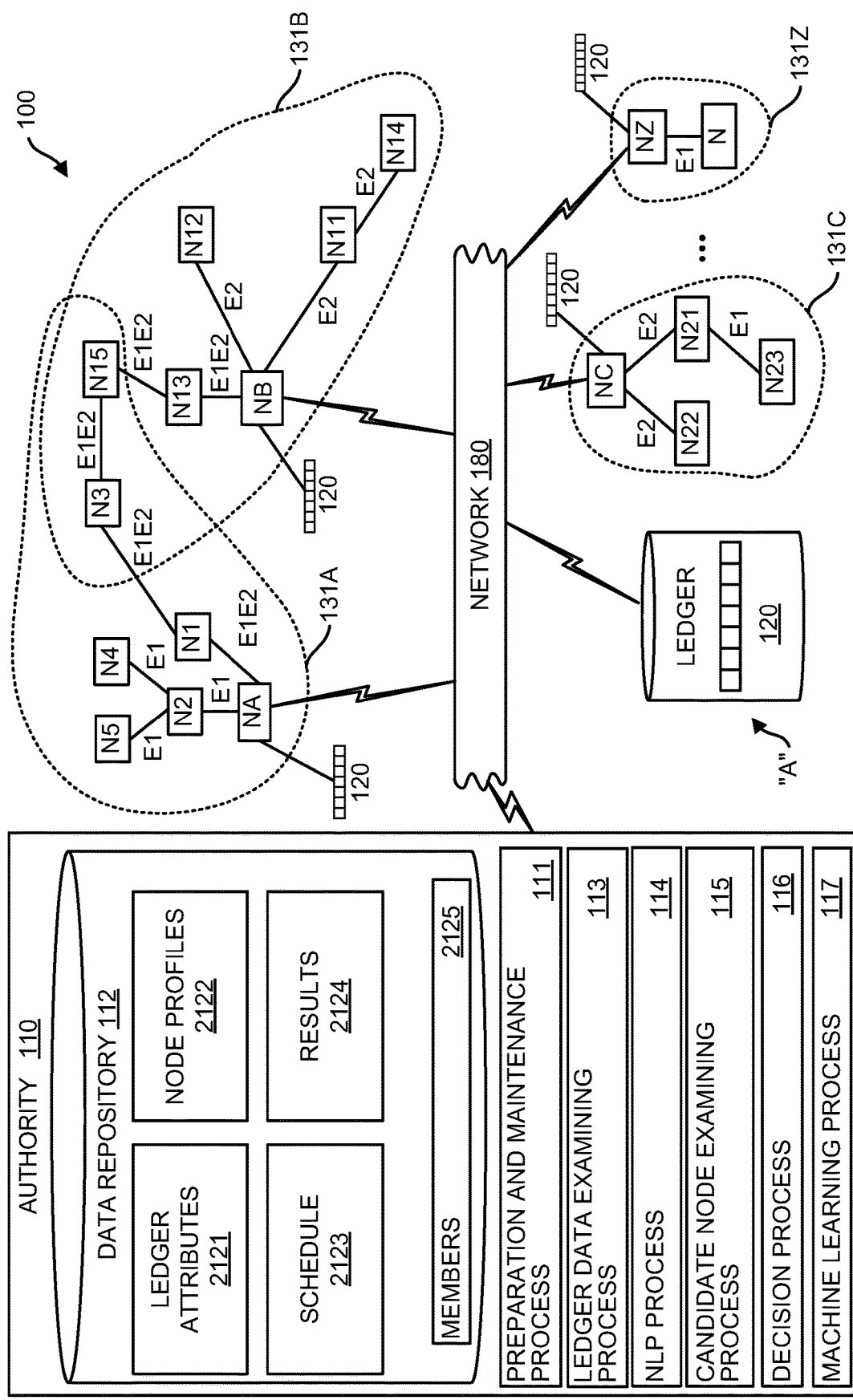
FIG. 1 depicts a system having an authority, a blockchain ledger and candidate nodes having access or prospective access in respect to the blockchain ledger according to one embodiment.

System 100 views managing transfer of access to a ledger is illustrated in FIG. 1. System 100 can include authority 110, having an associated data repository 112, ledger 120 at "A" and nodal networks 131A-131Z. Authority 110, ledger 120 at "A", nodal networks 131A-131Z can be in communication with one another via network 180. System 100 can include numerous devices as depicted in FIG. 1 which can be computing node based devices connected via network 180. Network 180 can be a physical network and/or a virtual network. The physical network can be, for example, a physical telecommunications network connecting numerous computing nodes or systems such as computer servers and computer clients. The virtual network can, for example, combine numerous physical networks or parts thereof into a logical virtual network. In another example, numerous virtual networks can be defined or a single physical network.

According to one embodiment, authority 110 can be external to ledger 120 at "A" and to nodes of the various nodal networks 131A-131Z. According to another embodiment, one or more of authority 110, ledger 120 at "A", and candidate nodes NA-NZ of nodal networks 131A-131Z can be co-located with one another. Ledger 120 at "A" can be a distributed ledger that can be distributed to be associated to each of various candidate nodes NA-NZ of respective nodal networks 131A-131Z where candidate nodes are member nodes of a blockchain network having access to ledger 120. Ledger 120 at "A" can be an instance of ledger 120 configured as a database that is associated to authority 110.

According to one embodiment, ledger 120 can be an immutable ledger and can be provided by a blockchain ledger. Ledger 120 can include a list of records, called blocks, which can be linked together using cryptography. Each block of ledger 120 can include a cryptographic hash of a previous block, a time-stamp, and transaction data, e.g., as can be represented by a Merkle Tree Root Hash. Ledger 120, which can be provided by a blockchain ledger, can be resistant to modification of data. Ledger 120 can be configured so that once a block of data is recorded into ledger 120, the data cannot be altered retroactively without alteration of all subsequent blocks. According to one embodiment, alteration of ledger 120 can be restricted and, according to one embodiment, can be permissible, e.g., only on consensus of a network majority. Each block of a blockchain can contain a hash (that is a digital fingerprint or unique identifier), time-stamped batches of recent valid transactions and the hash of the previous block. Previous block hash can link the blocks together and prevent any block from being altered or a block being inserted between two existing blocks and, this way, each subsequent block strengthens the verification of the previous block and, hence, the entire blockchain.

The method renders the blockchain tamper-evident, leading to the attribute of immutability. Ledger 120 can be a distributed ledger that can be distributed to candidate nodes. Candidate nodes of system 100 can include candidate nodes NA-NZ. Each candidate node can be included in and associated with a nodal network. Candidate node NA can be associated with nodal network 131A, candidate node NB can be associated to nodal network 131B, and candidate node NC can be associated to nodal network 131C. Further, candidate node NZ can be associated to nodal network 131Z. Nodal networks 131A-13Z can be social networks according to one embodiment. Ledger 120 can store various data. According to one embodiment, ledger 120 can store work project data, such as work project data of an IT ticket order. Various stages of a project can be worked on by various member users who are associated to respective candidate nodes NA-NZ.

According to one embodiment, ledger 120 can include an original work list. As member users work on a project, the members can add transaction data, including documents to ledger which, on completion, become part of the ledger 120. Ledger 120 can be a distributed ledger and candidate nodes NA-NZ can be member nodes of a blockchain network having access to ledger 120 or can be nodes that are qualified to become member nodes of a blockchain network having access to ledger 120 on invitation. Authority 110 can mediate different access rights defined by permissions for different members. For performance of a handoff transition from a first candidate node to a second node, authority 110 can relegate access of the first candidate node and promote access of the second candidate node.

System 100 can be configured so that when a member completes an update to ledger 120, the updated ledger is distributed to all candidate nodes NA-NZ. System 100 can be configured so authorization for transactions to be appended to ledger 120 is in dependence on a quorum of member nodes validating the transaction. Authority 110 together with member nodes having access to ledger 120 can define a blockchain network.

Each candidate node NA-NZ can participate in a nodal network. Candidate node NA can participate in nodal network 131A, candidate node NB can participate in nodal network 131B, candidate node NC can participate in nodal network 131C, and candidate node NZ can participate in nodal network 131Z. Each nodal network can include social network nodes that have a social connection to a candidate node NA-NZ. Candidate node NA can include first order social contacts N1 and N2, second order contacts N3, N4 and N5, and third order contact N15. Candidate node NB can include first order contacts N11, N12 and N13, second order contacts N14 and N15, and third order contact N3. Social contact nodes N3 and N5 can be shared between nodal network 131A and 131B where, according to one embodiment, nodal network association is limited to third order contacts of a candidate node. Candidate node NC can include first order contacts N21 and N22 and second order contact N23. Candidate node NZ can include representative first order contact N. The various nodal networks can include edge connections as are depicted in FIG. 1. The edges between the nodes of the various nodal networks 131A-131C can specify one or more skill topic classification associated to connections of a social relationship.

In FIG. 1, skill topic classifications are specified as being either E1 or E2 or both E1 and E2, "E1E2". E1 can be a first skill topic classification and E2 can be a second skill topic classification. Embodiments herein recognize that users can have social relationships that are based upon a skill topic classification of the user to whom they are connected. According to one embodiment, E1, as depicted in FIG. 1, can indicate the skill topic classification "software developer" whereas the skill topic classification E2 can indicate the classification "hardware architect". The edge label "E1" can represent a social relationship between first and second nodes based on first and second nodes having common work experience in the skill topic classification "software development" whereas the edge label E2 can represent a social relationship between first and second nodes based on first and second nodes having common work experience in the skill topic classification "hardware architect". Some edges are labeled both E1 and E2 to indicate common work experience between first and second nodes in the skill topic classifications "software development" "hardware architect".

According to one embodiment, authority 110 can be configured to intelligently hand off access to ledger 120. The intelligent handing off of access can include, e.g., handing off of an editing access right to ledger 120. According to one example, authority 110 can intelligently manage the transfer of access to ledger 120 from candidate node NA, to candidate node NB, and then to candidate node NC. Authority 110 can be configured to mediate access transitions according to any order between candidate nodes NA-NZ in dependence on one or more criterion.

According to one embodiment, ledger 120 stores data on a work project, and a user of a candidate node works on the work project with assistance from users of that candidate node user's associated nodal network. For example, for the performance of work item, tasks by a user of candidate node NA can engage the assistance of users of nodes within nodal network 131A, such as node N1, node N2, node N3, node N4, and node N5 and node N15 (FIG. 1).

Authority 110 can transition access to ledger 120 between first and second nodes based on one or more criterion being satisfied. Authority 110 transitioning access between first and second nodes can include authority 110 handing off access from the first node to the second node. When a certain candidate node, e.g. candidate node NA, has editing access to ledger 120, a user of certain candidate node NA can edit i.e., add to blocks of ledger 120 as new tasks of a work project are performed. Embodiments herein recognize that while it can be beneficial to hand off an access right such as an editing right to a ledger in a variety of scenarios, such as in completion of a work project, challenges exist. Embodiments herein recognize that as a work project proceeds, users of nodes within a nodal network, such as nodal network 131A may have diminished capacity to complete a work project. For example, as the skills preferred for completion of a work project change, embodiments herein recognize that the skills of users within nodal network 131A, can become mismatched with respect to the work project skill topic preferences. For example, a current nodal network having primary access to ledger 120 through a certain candidate node can have a high level of skill in skill classification A and a low level of skill in skill classification B while the preferred skill topic classification for a work project transitions from A to B. Also, through the passage of time, a current time can advance beyond the scheduled available work hours of users within nodal network 131A. Example high level scenarios which can trigger intelligent access transition between a first nodal network 131A by candidate node NA to another nodal network 131B by another candidate node NB, are now herein described.

According to one embodiment, a criterion for use in examining whether access to a ledger 120 is to be transitioned can include a topic criterion. In reference to the work project example embodiments herein recognize that a work project can include topics that are associated to different skill categories and that the topics of a work project associated to skill categories can change as a work project advances. For example, at an earlier stage of a work project, a first expert skill can be designated preferred and in a later stage of a work project, a second expert skill can be designated preferred. In an IT ticket example, a software development skill topic classification can be returned as preferred skill topic classification for a first stage and a hardware architecture skill topic classification can be returned as a preferred skill for a second stage.

Referring to FIG. 1, it can be seen that nodal network 131B can include skill topic classification capacities that are differentiated from the skill topic classification capacities of nodal network 131A. Namely, nodal network 131B can have skill capacities in the E2 skill topic classification that are greater than the E2 skill topic classifications of nodal network 131A. In the described example, E2 can specify a "hardware architecture" skill topic classification capacities and E1 can specify a "software development" skill topic classification capacities. Accordingly, it can be seen that in one high level example, authority 110 based on a topic criterion can transition access to ledger 120 from a first candidate node to candidate node NB and its associated nodal network 131B based on a determination that a skill topic of a work project has transitioned from a skill topic associated to the skill identified by the E1 identifier to a skill identified by the E2 identifier.

Referring to nodal network 131C, nodal network 131C can have skill capacities in both the E1 and E2 skill topic classifications that are reduced relative to those capacities in nodal network 131A and nodal network 131B. Notwithstanding authority 110 can based on certain one or more criterion handoff node access to ledger 120 to candidate node NC.

Authority 110 according to one embodiment can apply an availability criterion in determining whether to handoff access to a new candidate node. Embodiments herein recognize that users who perform work on work projects can have limited availability which often can be dependent on the hour of a day. Worker users can be available to work on projects, but often at preset time periods, e.g. 8 am-7 pm EST.

According to one embodiment, system 100 as set forth in FIG. 1 can be used to support a work project that originates on the east coast of the United States (U.S.) and which transitions to the west coast of the U.S. The user of candidate node NA is located on the east coast of the U.S., the user of candidate node NB is also located on the east coast of the U.S., and the user of candidate node NC is located on the west coast of the U.S. The majority of users of nodes of nodal network 131A can be located on the east coast, the majority of users of nodes of nodal network 131B can be located on the east coast, and majority of users of nodes of nodal network 131C can be located on the west coast.

The users of nodal network 131A and 131B in the described example can complete software development or hardware architecture skill topic classified items of the work project from the times 8 am-7 pm EST. However, after 7 pm the users associated with the nodes of nodal networks 131A and 131B can become unavailable.

Authority 110 according to one embodiment applying an availability criterion can examine calendar, e.g. work schedule information of users of nodes within a nodal network and can return access transfer decision based on such examined data. In the described example, authority 110 can transfer access to ledger 120 to candidate node NC, based on application of an availability criterion wherein there is a determination that the current time is approaching 7 pm EST and that the users of nodes within nodal network 131C are available to perform items of the work project, and that the users of nodes within nodal networks 131A and 131B are unavailable.

Authority 110 can be configured to facilitate the intelligent transition of access to ledger 120 between first and second different nodes of system 100, such as between candidate nodes NA and NB or between candidate nodes NA and NC or between candidate nodes NC and NB or between any other combination of first and second candidate nodes.

For providing the functionality herein, data repository 112 can include ledger attributes area 2121 for storing data on attributes of ledger 120, node profile area 2122 for storing data such as skills data and availability data for nodes of nodal networks 131A-131Z of system 100 and prospective nodal networks that can be generated by system 100, schedule area 2123 for storing data on a current schedule for system 100 which schedule can include, e.g. a schedule for transition of access to ledger 120 among nodes such as candidate nodes NA-NZ. Data repository 112 in results area 2124 can store historical data specifying results of a nodal networks 130A-130Z performing tasks of a work subject. Data repository 112 in members area 2125 can store data on members of a blockchain network having access to ledger 120, including e.g. data on the time of membership initiation, historical data on times of relegations and promotions of blockchain membership and/or access right(s) e.g. defined by permission(s), data specifying a schedule of access rights including scheduled transitions of access rights between nodes.

According to one embodiment, access rights of blockchain members who have access to ledger 120 can change over time, e.g. in accordance with data stored in schedule area 2123. An access right can change, e.g. from a "read only" access right to a "read and edit" access right. According to one embodiment, authority 110 can dynamically adjust one or more permission defining one or more access right to members of a blockchain. Authority 110 for example, can transition an access right of a candidate node from a "read only" access right to a "read and edit" access right when access handover is transitioned to the certain candidate node. In performing an access handoff, authority 110 can relegate access (e.g. removing one or more permission) of a first exiting node and promote access (e.g. adding one or more permission) of a second entering node.

Authority 110 can run preparation and maintenance process 111 so that data of areas 2121-2124 of data repository 112 is iteratively updated for optimized processing by other processes run by authority 110.

Authority 110 can run ledger data examining process 113 for examining data of ledger 120. Ledger data of ledger 120 can include, e.g. an original work list that specifies a list of items to be completed, e.g. in succession and ledger 120 can be modified over time, e.g. as access is transitioned to new candidate nodes of system 100, and as such candidate nodes complete tasks to append to the ledger 120 additional blocks.

Authority 110 running ledger data examining process 113 can determine skill topics associated to ledger 120 at a specific future point in time. A skill topic can refer to a preferred skill to perform a task specified in ledger 120 at a particular point in time. In one example, the particular point in time can be the current time. However, in another example the particular point in time can be a future point in time, e.g. N minutes in advance of the current time, e.g. 60 minutes. The specific future point in time can be a future time from the perspective of a human user perceivably delayed by a delay time relative to a current time.

Embodiments herein envision advantages to performing "warm handoff" between nodes of candidate nodes NA-NZ, so that transitioning nodes i.e. both exiting and entering nodes, have notification of a handover transition prior to the time of transition. In such an embodiment, further with reference to the IT ticket example, nodes can send one or more message to advise an underlying customer as to the transition and as to data points relevant to the transition.

Authority 110 for performance of ledger data examining process 113 can examine ledger data so as to predict skill requirements for a work project for a particular future point in time. For such predicting, authority 110 can for example examine data of a work list that references items to be completed in succession and can identify skill topics associated to items of a work project to be completed subsequent to the current time. For performing examining of data for predicting a skill topic associated with a future time, authority 110 can query a predictive model that has been trained by machine learning and using training data, wherein the training data includes supervised learning training data that associates past work items with past work items skill topics with next item work item skill topics.

Authority 110 running ledger data examining process 113 can run natural language processing (NLP) process 114. Authority 110 using NLP process 114 can segment and derive topics associated with work subject items included on ledger 120, including items of an original work list, as well as appended items that are specified in a succession of blocks of ledger 120.

Authority 110 can run NLP process 114 to process data for preparation of records that are stored in data repository 112 and for other purposes. Authority 110 can run a Natural Language Processing (NLP) process 114 for determining one or more NLP output parameter of a message. NLP process 114 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

Authority 110 can run NLP process 114 to process data for preparation of records that are stored in data repository 112 and for other purposes. Authority 110 can run a Natural Language Processing (NLP) process 113 for determining one or more NLP output parameter of a message. NLP process 114 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 114 authority 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

By running of NLP process 114, authority 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Authority 110 running candidate node examining process 115 can examine data of nodes associated to a plurality of candidate nodes, such as candidate nodes NA-NZ that are candidates for handoff of access to ledger 120. Authority 110 running candidate node examining process 115 can examine data of nodal networks, e.g. nodal network 131A for the candidate node NA. Data subject to examining by candidate node examining process 115 can include skill attribute data and/or availability attribute data for a nodal network, e.g. nodal network 131A-131Z. Skill attribute data can include skill topic classification data that is in dependence on skill topic classification of edges within a nodal networks 131A-131Z. Availability data can include, e.g. calendar derived data that is in dependence on work hour availability of users within a nodal network 131A-131Z. According to one embodiment candidate nodes NA-NZ can be nodes that are qualified to become members of a blockchain network having access to ledger 120. According to one embodiment candidate nodes NA-NZ can be existing member nodes of a blockchain network having access to ledger 120 of differing levels which different levels can be changed by an access handoff mediated by authority 110. Authority 110 running candidate node examining process 115 to examine data of nodal networks can examine data of established and existing nodal networks as well as prospective nodal networks, which prospective nodal networks can be generated in response to one or more output provided by authority 110.

Authority 110 running decision process 116 can apply artificial intelligence (AI) to return a decision to handoff access to ledger 120 to a subsequent node, such as to a subsequent candidate node of candidate nodes NA-NZ. Authority 110 running decision process 116 can include authority using data returned by performance of ledger data examining process 113 and candidate node examining process 115.

Authority 110 running decision process 116 can employ a weight based AI formula that is in dependence on a skill topic classification factor and an availability factor. A skill topic classification of the skill factor can be in dependence on an output of ledger data examining process 113 so that the skill topic classification factor can match a skill topic classification returned by examination of ledger data. Authority 110 mediating a handoff of access to ledger 120 from a first node of candidate nodes NA-NZ to a second node of candidate nodes NA-NZ can include authority 110 relegating access of the first candidate node and promoting access the second candidate node. A relegation of access can include e.g. terminating membership of the first node in a blockchain network, and/or maintaining membership of the first node and terminating an editing right of the first node in ledger 120. A promotion of access can include e.g. inviting the second candidate node to become a member of a blockchain network in which members have access to ledger 120 and/or adding one or more access right defined by one or more permission to the second node having an associated user.

On completion transition of access to ledger 120 between a first exiting candidate node and a second entering candidate node, the second candidate node can be regarded as a primary node having primary access to ledger 120 and the nodal network associated to a primary node an engaged nodal network, e.g. which can be engaged to perform items of work project having transactions recorded in ledger 120.

Authority 110 can run machine learning process 117 for AI decision outputs that are of improved accuracy and reduced computational overhead. Authority 110 running machine learning process 117 can, for example, train predictive models, e.g. so that ledger data examining process 113 is able to better predict future skill topic classifications associated to a current project at a specific future point in time in dependence on skill topic classifications of work currently being performed, and/or which has been previously performed. Authority 110 running machine learning process 117 can for example, train predictive models with use of supervised training, wherein training data includes attribute data associated with a nodal network 131A, aligned to a task of a work project in connection with results data associated to such engagements.

Authority 110 running membership process 118 can for example invite new nodes to become members of a blockchain network an can also terminate membership of nodes based on one or more criterion being satisfied. Authority 110 running membership process 118 can also, e.g. for various candidate nodes NA-NZ dynamically adjust access to ledger 120 defined by permissions. Permissions can include, e.g. "read only" access to ledger 120, and as another example "read and edit" access to ledger 120.

Authority 110 can be configured according to one embodiment so that membership process 118 dynamically adjusts permissions associated to candidate nodes so that only one or more candidate node of candidate nodes NA-NZ is given "editing" access to ledger 120 at a given time to thereby provide such advantages as avoiding multiple nodes working on a work project specified in ledger 120 simultaneously. An editing access right can be regarded as a primary access right.

Figure 2:
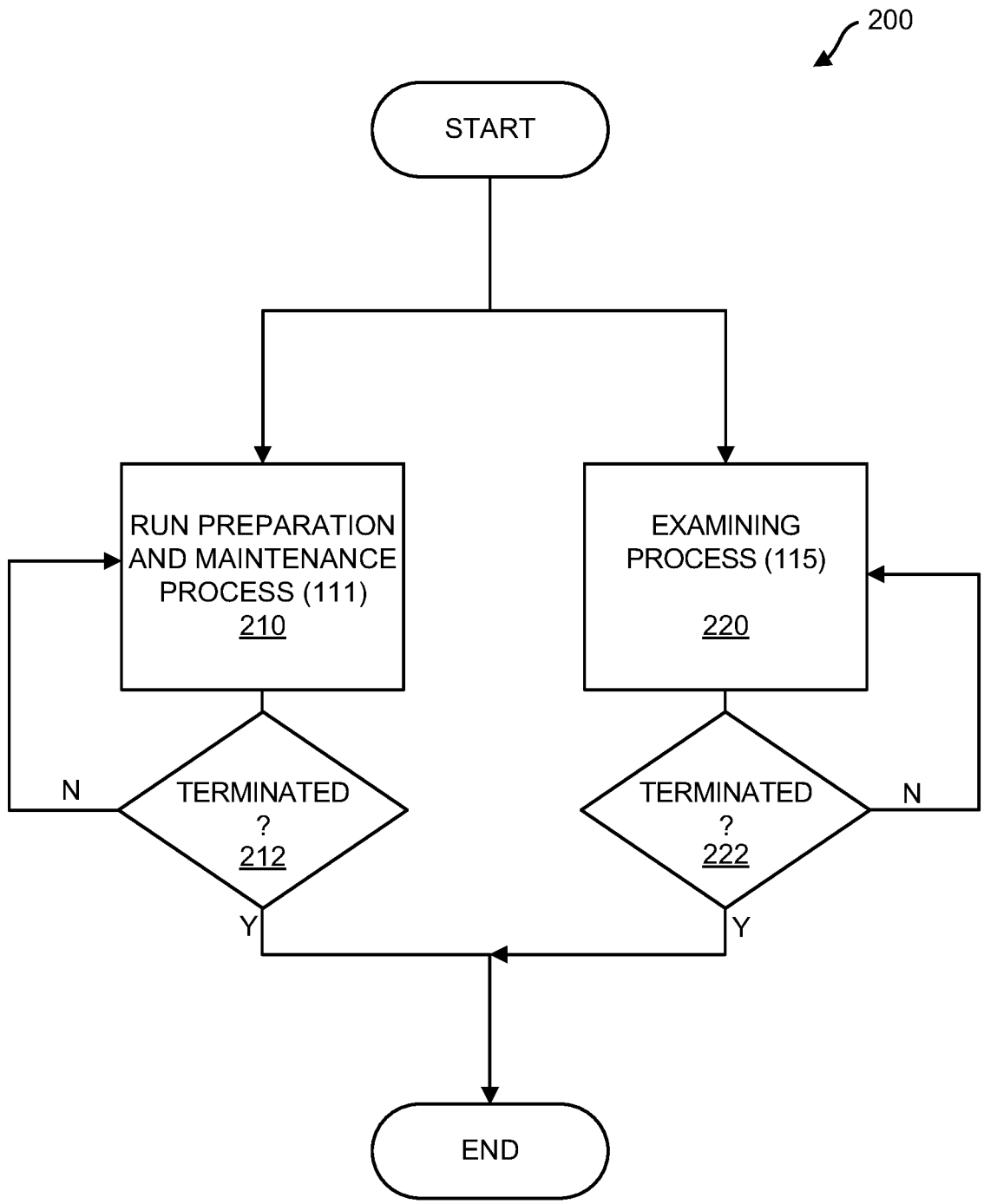
FIG. 2 is a flowchart illustrating a method for performance by an authority according to one embodiment.

FIG. 2 is a flowchart illustrating a method 200 that can be performed by authority 110. At block 210 authority 110 can run preparation and maintenance process 111, e.g. to populate, prepare, and/or maintain various data of data repository 112 such as data of areas 2121-2124. For performance of preparation and maintenance process 111 authority 110 can be configured to automatically process data inputs received from nodes of system 100 such as nodes defining nodal networks of prospective nodal networks. Authority 110 can run preparation and maintenance process 111 iteratively until preparation and maintenance process 111 is terminated at block 212. At block 220, authority 110 can run candidate node examining process 115. A plurality of instances of examining process 115 can be simultaneously run. Authority 110 can run examining process 115 until examining process 115 is terminated at block 222. With the performing of examining process 115 iteratively, authority 110 can be running associated processes iteratively such as processes 113-114 and processes 116-118.

Figure 3:
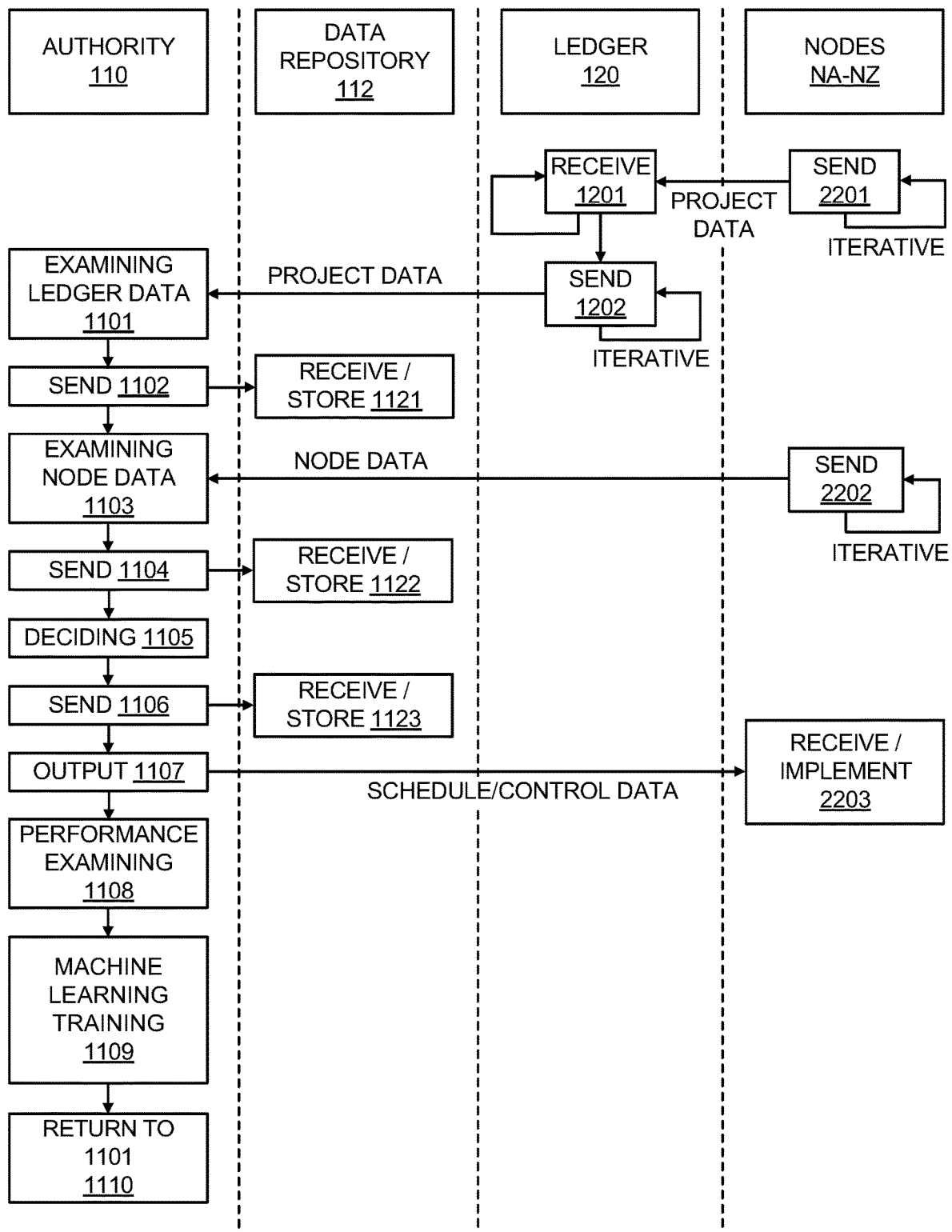
FIG. 3 is a flowchart illustrating a method for performance by an authority interacting with a blockchain ledger and with candidate nodes according to one embodiment.

The flowchart of FIG. 3 illustrates authority 110 performing a method by way of authority 110 interacting with ledger 120 and nodes of nodes NA-NZ for performance of a method.

At block 2201 a candidate node of candidate nodes NA-NZ currently having a primary access right to ledger 120 can be performing a task in relation to a work project specified in ledger 120 and ledger 120 based on data of the performed task can be updating ledger 120 for the appending of additional one or more blocks onto a blockchain of ledger 120. Member nodes of a blockchain network having access to ledger can approve by a quorum all transactions resulting in blocks being added to ledger 120.

In response to received data received at block 1201, ledger 120 at block 1202 can iteratively send project data to authority 110 and in response to the project data received by authority 110 at block 1101, authority 110 can perform examining of ledger data. Authority 110 can perform examining of ledger data at block 1101 and at block 1102 authority 110 can send data returned by the examining of ledger data to data repository 112 for receipt and storage by data repository 112 at block 1121 into ledger attributes area 2121 of data repository 112. Examining of ledger data can include according to one embodiment determining a skill topic classification for a current work project. A returned skill topic classification can include e.g. a returned current preferred skill topic classification, and or a predicted future preferred skill topic classification. As set forth in Table A, authority 110 at block 1101 can tag work data for skill topic classification.

TABLE A

| Text | Label | Set |
| --- | --- | --- |
| fabbione: ahoy | Developer | Training |
| my fast i386 is still running unstable | Developer | Training |
| re | Developer | Training |
| mdz: any news? | Developer | Training |
| mdz: permission to upload new isb with AMD64 support? #1354, patch at [WEBSITE LINK] | Developer | Training |
| phwoar | Developer | Training |
| hey | Developer | Training |

TABLE A-continued

| Text | Label | Set |
| --- | --- | --- |
| pitti: Subject: hal 0.2.98 released | Developer | Training |
| jdub: nobody replied to my mail, but seriously, I want a NEEDINFO state :) | Developer | Training |
| jdub: [WEBSITE LINK] | Developer | Training |
| mdz: i386 or amd64? | Developer | Training |
| daniels: oh btw.. i think i have the fix for Xv on nvidia | Developer | Training |
| jdub: [WEBSITE LINK] | Developer | Training |
| jdub: permission for #1286? | Developer | Training |
| fabbione: oh, what kind of drivers I'm using? | Architect | Training |
| Mithrandir: it will cost me less to buy him an adsl ;) | Architect | Training |
| right, hopefully this is the last firefox build | Architect | Training |
| can someone using ppc run gnome-audio-profiles-properties for me? | Architect | Training |
| jdub: #1607 OK? | Architect | Training |
| Mark wants several questions moved back to pre-reboot, and I really don't want to duplicate the code if I can help it | Architect | Training |
| Kamion: which mail are you talking about? | Architect | Training |
| Kamion: you'll be pleased to know that john is now bothering bruce | Architect | Training |
| seb128: [WEBSITE LINK] | Architect | Training |
| morning | Architect | Training |
| looks like my AP didn't survive the power mess yesterday either. :-( | Architect | Training |

As shown in Table A, work project data according to one example can include a blog specifying items of current work tasks of a current work project having data of work items recorded in ledger 120. As shown in Table A, each row of data of the blog can be tagged with an applicable skill attribute classification e.g. in reference to Table A, "developer" for the skill topic classification "software development" or "architect" for the skill topic classification "hardware architect". Machine learning processes can be used for the return of the skill topic classifications as will be set forth in further detail herein. Various rules based criterion can be used for the return of a skill topic classification of a current work project. According to one example, the current skill topic classification for a work project to be taken as the last entry of file data such as shown in Table A specifying current work. In another example, a weighted average can be used, e.g., the returned work topic classification can be taken as the majority classification over a most recent predetermined period of time. For example, whereas "developer" is specified as the last classification but architecture is the classification in 60% of flagged data items over the last one hour period of time. "hardware architect" can be returned as the skill topic classification and not "software developer". According to one embodiment, authority 110 can be configured to predict a skill classification of a skill preferred for performance of a work project at a time period in advance of the current time, e.g., 10 minutes in advance, 20 minutes in advance, an hour in advance and so on.

Embodiments herein recognize that it can be advantageous to provide a warm transfer of candidate node access to ledger 120, e.g., so that an underlying customer can be notified as to the transition and further so that an exiting node subject to relegation of access and an entering node subject to promotion of access can share data regarding the transition to improve the performance of work items of a work project. Authority 110 can perform various processes to facilitate such a warm transfer.

According to one embodiment, authority 110 at block 1101 can examine ledger data at a root block of a blockchain defining ledger 120. Such a root block can define a master worklist for a work project, e.g., as can be defined by a master services agreement. Authority 110 can examine both work items of the master work list that are specified and can compare the same to work items that are referenced in ledger 120 as being already completed. For returning a prediction of a preferred skill topic classification for a specific future point in time, authority 110 can examine data of such master work list to data specifying items already completed to determine a next N items of a work project to be performed e.g. in an order specified in a master worklist of ledger 120.

For example, if a master worklist lists four items with the fourth item being processed to return a skill topic classification of "hardware architect" and according to ledger 120 the first three items have already been performed, authority 110 based on the worklist data included in the ledger data and the remaining ledger data which indicates items already complete, can return prediction data specifying that a skill topic classification of the work project at a specific future point in time has the skill topic classification of "hardware architect" (the next item listed in a master worklist which has not yet been performed).

Authority 110 performing examining at block 1101 to return a prediction as to skill topic classification of a work project at a future point in time can in addition, or alternatively, include authority 110 using a predictive model trained by machine learning processes for return of prediction data. Machine learning processes for return of prediction data specifying predicted future skill topic classification for a work project using machine learning will be detailed further herein. Training data for such a predictive model can include iterations of observed skill topic classifications for various time segments.

At block 2202, candidate nodes NA-NZ which can be candidate nodes that may be selected by authority 110 for handoff of access to ledger 120 can be iteratively sending data for receipt by authority 110 at block 1103. In response to receipt of node data at block 1103 authority 110 can examine node data and send resulting node attribute data to data repository 112 for receipt and storage by data repository 112 at block 1122. Data repository 112 receiving and storing node attribute data at block 1122 can include data repository 112 storing data into node profiles area 2122 of data repository 112. Node data sent at block 2202 can include data for use by authority 110 in generating node attribute data. Authority 110 can receive node data at block 1103 based on returned node attribute data can send returned attribute data for sending by authority 110 at block 1104 into data repository 112 for receipt and storage by data repository 112 at block 1122 into node profiles area 2122 of data repository 112. Returned node attribute data returned at block 1103 can include node skill topic classifications and node availability classifications for the nodal networks 131A-131Z associated to each respective candidate node NA-NZ.

Authority 110 at examining node data block 1103 can active candidate node examining process 115 to examine nodes and edges of nodal network 131A associated to candidate node NA and nodal network data for all remaining candidate nodes. Authority 110, in the described example as set forth in reference to FIG. 1 can return attribute scores for the skill topic classification E1 and the skill topic classification E2 for each candidate nodal network 131A-131Z associated to a respective candidate node NA-NZ which can be selected as a succeeding nodal network engaged to work on the work project referenced in ledger 120. Authority 110 according to one embodiment can count the edges for each classification E1-E2 and can add weights to the classifications based on edge proximity to candidate node NA which serves as the root node for nodal network 131A. Edges closer to a root node can be weighted higher than nodes spaced from a root node.

For return of node attribute data associated to node NA, authority can examine node data of nodal network 131A associated to node NA. Authority 110 can examine calendar data of the users of nodes N1-N5 and N15 for determining availability of the various users within nodal network 131A. Authority 110 for each candidate nodal network 131A-131Z respectively associated to a candidate node NA-NZ can generate availability attribute data on a per skill topic classification basis so that for each skill topic classification there can be recorded a different availability attribute data item.

Authority 110 at block 1103 can be returning node attribute data each nodal network 131A-131Z associated to each candidate node NA-NZ of system 100 and the attribute data can be subsequently stored by data repository 112 at block 122 e.g. into node profiles area 2122 of data repository 112.

Authority 110 at block 1105 can perform deciding as to a node for handoff of access to ledger 120. The deciding at block 1105 can be in dependence on the examining of ledger data at block 1101 and the examining of node data at block 1103.

At deciding block 1105, authority 110 can decide to relegate ledger access of a first candidate node and to promote ledger access a second candidate node. The relegation can include removing a permission, e.g. an editing permission from the set of permissions including a reading right and an editing right. The promotion can include adding one or more permission to the second candidate node, e.g. adding a ledger editing right to an existing read right.

Authority 110 performing deciding at deciding block 1105 can include authority 110 activating decision process 116 (FIG. 1). Authority 110 running decision process 116 can include authority using data returned by performance of ledger data examining process 113 and candidate node examining process 115. Authority 110 performing deciding at block 1105 can include authority 110 returning a predicted performance score for each candidate node NA-NZ as set forth in Eq. 1 below.

$$P = F_1 W_1 + F_2 W_2 \qquad \text{(Eq. 1)}$$

Where P is a predicted performance score for a nodal network associated to a candidate node, $F_1$ is a first factor, $F_2$ is a second factor and $W_1$ and $W_2$, respectively, are weights associated with the first and second factors. In the described example, the factor $F_1$ can be a skill topic classification factor for the returned work project classification returned by the examining of ledger data at block 1101. That is, where the examining of ledger data indicates the skill topic classification of Eq. 1. Factor $F_1$ is based on the skill topic classification attribute pertaining to the skill topic classification Eq. 1. Still referring to Eq. 1, the factor $F_2$ can be an availability factor returned for the candidate node for the skill topic classification that matches the return skill topic classification returned by the examining of ledger data at block 1101.

Eq. 1 can be configured to have a weight W2 associated factor $F_2$ referencing availability is sufficiently high so that access handoff to a certain candidate node is safely avoided unless there is sufficient availability associated to a candidate node. In response to performing deciding at block 1105 authority 110 can proceed to block 1106 to perform sending a return scheduled data specifying a schedule for handoff of access to ledger 120 between nodes. Scheduling data can be received by data repository 112 at block 1123 for storage in data repository 112 at block 1123.

Figure 4:
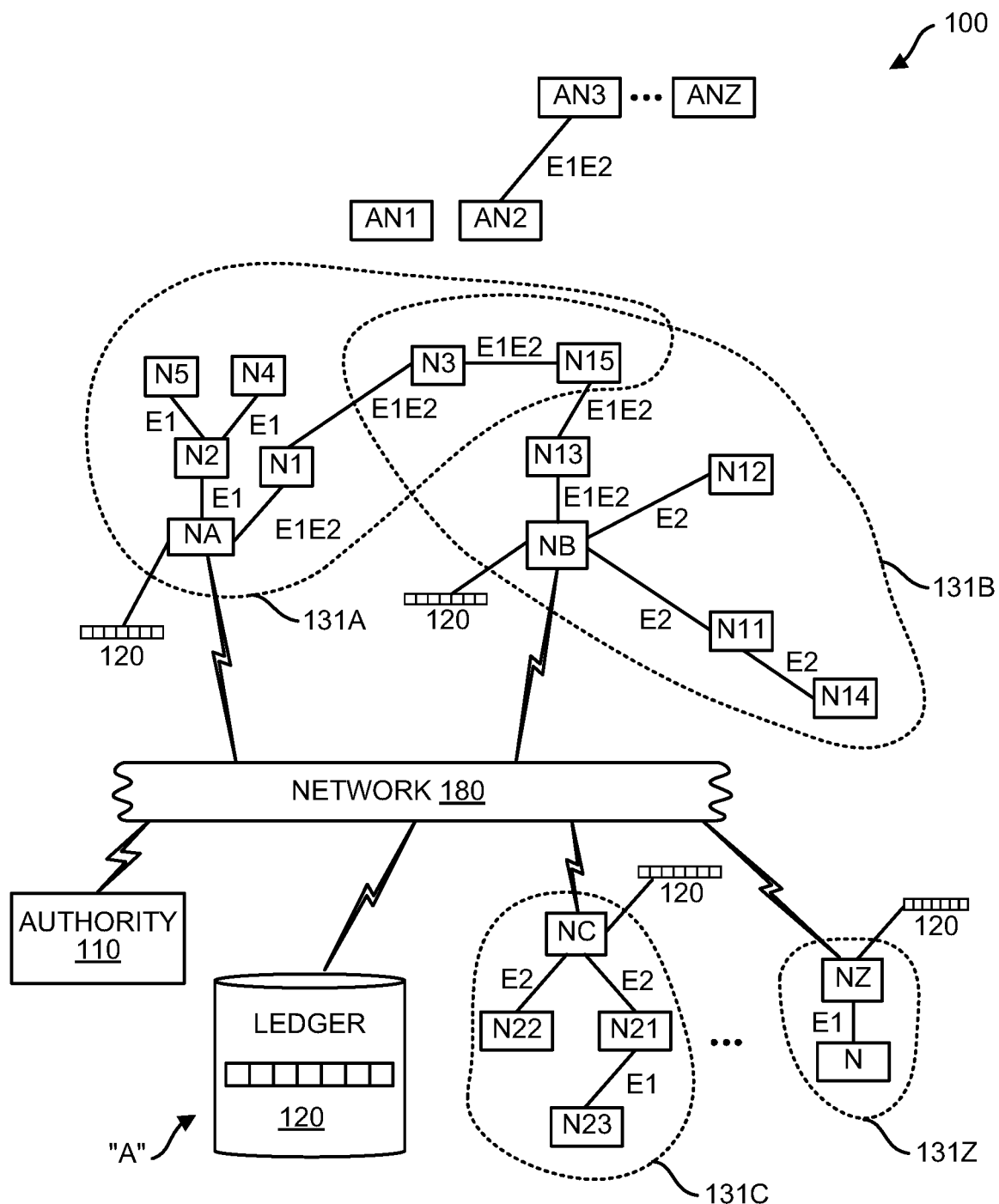
FIG. 4 depicts a system having additional nodes that can form reconfigured nodal networks with existing nodal networks according to one embodiment.
Figures 5, 6:
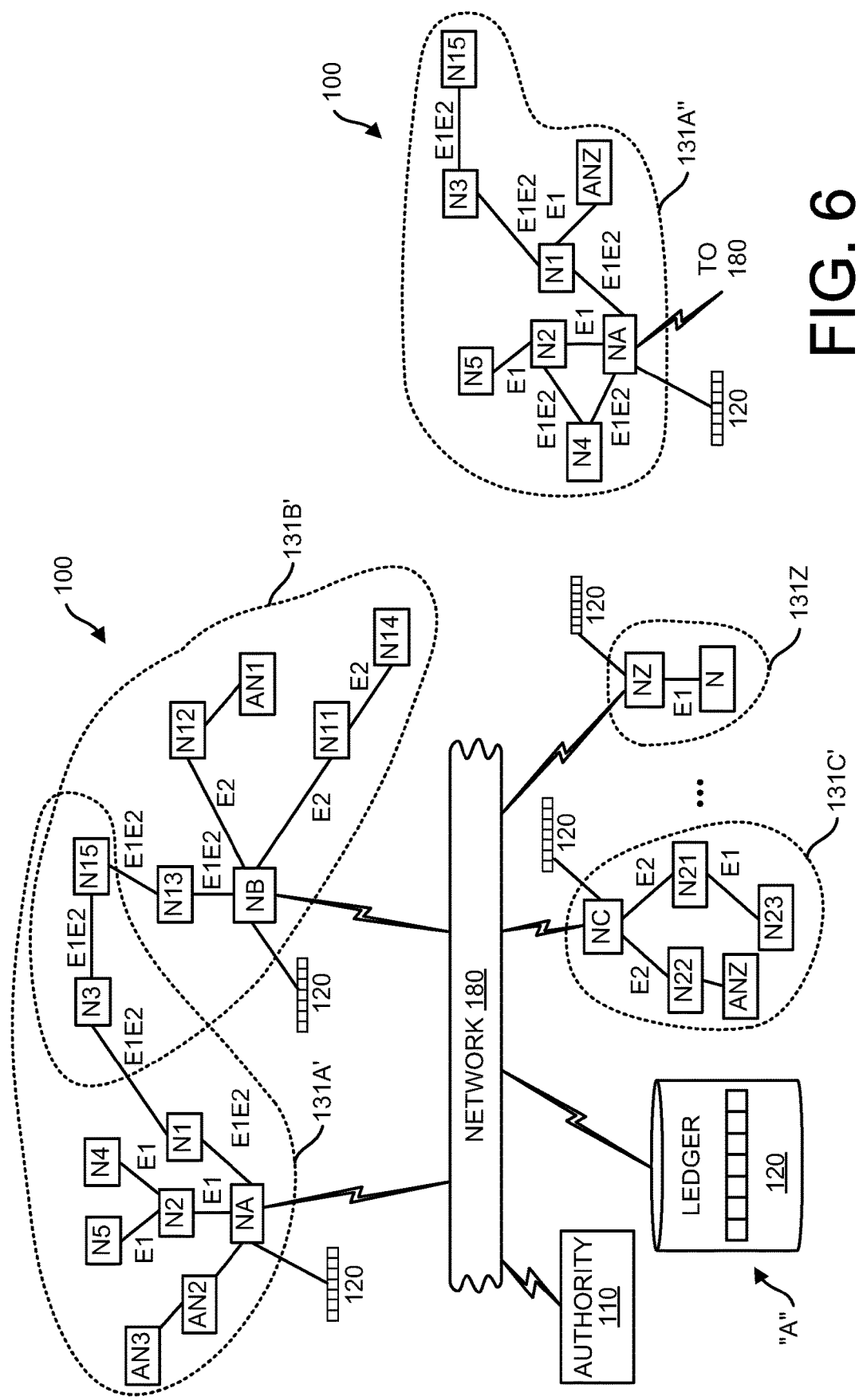
FIG. 5 depicts a system having prospective nodal networks according to one embodiment.
FIG. 6 depicts a system having prospective nodal networks according to one embodiment.

Authority 110 performing examining node data at block 1103 can include authority 110 examining data of additional nodes, such as additional nodes AN1, AN2, AN3 . . . ANZ as depicted in FIG. 4. Authority 110 activating candidate node examining process 115 can include authority 110 examining prospective nodal networks that are prospective reconfigurations of existing nodal networks 131-131Z (FIG. 1) wherein prospective nodal network can be provided by the addition of one or more additional node AN1-ANZ therein. Referring to FIG. 5, for example, prospective nodal network 131A' refers to nodal network 130A (FIG. 1) as modified by the inclusion of additional nodes AN2 and AN3 which, according to FIG. 4, are in social network association prior to their inclusion in nodal network 131A. Further referring to FIG. 5, nodal network 131B' refers to nodal network 131B (FIG. 1) as modified and reconfigured by the inclusion of additional nodal network AN1 therein. Further referring to FIG. 5, nodal network 131C' refers to nodal network 131C (FIG. 1) as modified by the inclusion of additional node ANZ. Authority 110 at block 1103 can include authority 110 examining with existing nodal networks 131A to 131Z as shown in FIG. 1. Prospective nodal networks, such as prospective nodal networks 131A', 131B' and nodal network 131C', which can be prospectively provided as shown in FIG. 5.

Referring to FIG. 4, additional nodes AN1-ANZ can be nodes that are not currently connected to social network 131A-131Z, having a candidate node such as candidate nodes NA-NZ where a candidate node is a candidate node for accepting a hand-off in a ledger transition. Alternatively, one or more of additional nodes AN1-ANZ can be included in an existing nodal network 131A-131Z having a candidate node NA-NZ. Embodiments herein recognize that social networks, such as collaborative social networks useful for performance of tasks of a collaborative work project specified in a blockchain ledger, need not be static but rather can be dynamic social networks that are continually changing and, in some embodiments, changing in dependence on one more action of authority 110. According to one embodiment, authority 110 can be configured so that authority 110 provides one or more output to dynamically change an existing nodal network 131A-131Z in a manner for improving the performance of the nodal network in relation to a work project of ledger 120.

According to one embodiment, system 100 can be configured so that authority 110 can provide one or more output to initiate sending of invites from one or more node of an existing social network 131A-131Z to one or more additional node AN1-ANZ a reconfiguration of an existing nodal network 131A-131Z. Embodiments herein recognize that nodal network reconfigurations initiated by authority 110 are not limited to reconfigurations of the type described in reference to FIG. 5, but can also include reconfigurations involving current one or more nodes of an existing nodal network. FIG. 6 illustrates a reconfiguration of nodal network 131A (FIG. 1). Referring to FIG. 6, nodal network 131A can be reconfigured to establish reconfigured nodal network 131A" by the reordering of node N4 is directly connected as a first order node to node NA. Authority 110 can initiate the reconfiguration depicted in FIG. 6 by processes that include providing an output to initiate a sending of an invite by node NA to invite node N4 to become a first order connection of node NA. Further in reference to FIG. 6, authority 110 can provide an output so that node N1 invites node ANZ to become a first order connection of node N1. Authority 110 can initiate reconfigurations of existing nodal networks by a process that includes providing one or more output to initiate an invite by one or more existing node to another node, e.g., node N4, or node ANZ in the example described in connection with FIG. 6 to become a connection such as a first order connection.

According to one embodiment, nodes of system 100 such as candidate nodes NA-NC, nodes N1-N, and nodes AN1-ANZ can subscribe to a service provided by authority 110 wherein authority 110 can provide an output to initiate automatic sending of a social network connection invite from the subscribing node. Thus, in reference again to FIG. 5, node NA can have subscribed to a service provided by authority 110 permitting authority 110 to provide an output to initiate the sending of a social network connection invite by node NA to additional node AN2, which invite can be accepted by node AN2 so that the social network, including nodes AN2 and AN3, can become part of reconfigured nodal network 130A' as depicted in FIG. 5.

Authority 110 performing deciding at block 1105 can include authority 110 activating decision process 116 (FIG. 1). Authority 110 running decision process 116 can include authority 110 using data returned by performance of ledger data examining process 113 and candidate node examining process 115. Authority 110 for performing deciding at block 1105 wherein node data includes node data of prospectively reconfigured nodal networks can include authority 110 applying Eq. 2 as set forth herein below.

$$P=F_1W_1+F_2W_2+F_3W_3 \qquad (Eq. 2)$$

Where P is a predicted performance score for a nodal network associated to a candidate node; $F_1$ is a first factor; $F_2$ is a second factor; $F_3$ is a third factor; and $W_1$-$W_3$, respectively, are weights associated with the first through third factors. In the described example of Eq. 2, the factors $F_1$ and $F_2$ and weights $W_1$ and $W_2$ can be as described in connection with Eq. 1. $F_3$, on the other hand, can be a probability factor that specifies a probability of a prospective nodal network being established. For determining the probability of a prospective, e.g., reconfigured nodal network being established, authority 110 can examine data of a predictive model that predicts the likelihood of an invited node of system 100 accepting an invitation for connection to a social network which connection will, if formed, result in reconfiguration of a nodal network such as one of nodal networks 131A-131Z as set forth in FIG. 1 and FIG. 4. Such predictive model can be trained using machine learning as set forth herein.

Authority 110 at deciding block 1106 can return a decision specifying a candidate node to which to transition ledger access. Authority 110 at deciding block 1106 can return a decision specifying a candidate node to which to transition ledger access on the basis of which candidate nodal network associated to a candidate node produced the highest predicted performance score, P. According to one embodiment, candidate nodal networks can be limited to existing nodal networks having a candidate node NA-NZ. According to one embodiment, candidate nodal networks subject to performance predicting can include prospective nodal networks having a candidate node NA-NZ which prospective nodal networks can be generated in dependence on one or more output provided by authority 110. Authority 110 can provide permutations of prospective nodal networks and can subject such prospective nodal networks and existing nodal networks to performance predicting using Eq. 2. On the return of an action decision at block 1106 to hand off access of ledger 120 to a candidate node of a prospective nodal network, authority 110 can provide one or more output to generate the prospective nodal network to establish the prospective nodal network as an established and existing nodal network.

Embodiments herein recognize that scoring of candidate nodal networks using Eq. 1 or Eq. 2 can be in dependence on a matching between a returned skill topic classification of examined ledger data, and a returned skill topic attributed of examined node data. For example, Factors F1 and F2 can be factors in dependence on a matching between a ledger skill topic classification and a nodal network skill topic classification. Accordingly, authority 110 can return a selected entering candidate node to which to transition access to ledger 120 in dependence on a topic matching between ledger 120 and a nodal network (e.g. existing or prospective) of system 100.

At block 1107, authority 110 can provide one or more output. One or more output at block 1107 can include one or more communication to candidate nodes that are parties to a handoff. Authority at block 1107 can send to an exiting node and an entering node schedule data and control data. The schedule data can include data that specifies a time for a transition handoff at which time an exiting node's access can be relegated and further at which time an entering node's access can be promoted, e.g., to include an editing right to ledger 120 in addition to a read right.

According to one embodiment, to facilitate a warm transfer, authority 110 at block 1107 can send schedule and control data a preset time prior to a transition time. The preset time can be, e.g., 10 minutes, a half-hour or an hour from the time of receipt by an exiting node and an entering node at block 2203. The receipt by an exiting and entering of candidate nodes NA-NZ at block 2203 of scheduling data prior to a transition time handoff facilitates the users of the exiting and entering nodes communicating with one another via the entering and exiting and entering nodes data regarding the transition and allows the users of the exiting and entering nodes to communicate with an underlying customer regarding the transition.

The control data can be control data to facilitate access relegation of an exiting candidate node and/or access promotion of an entering candidate node. The control data can include control data for facilitation of relegation of permissions in the case of an exiting node or control data for facilitation of promotion of permissions in the case of an entering node.

In the case a prospective nodal network is selected as a succeeding engaged nodal network associated to a selected entering candidate node, authority 110 providing one or more output at block 1107 can include authority 110 providing one or more output to generate the prospective nodal network so that an established and existing nodal network is generated in accordance with the selected prospective nodal network. The one or more output provided by authority 110 can include one or more output to initiate the sending by one or more certain node of a nodal network associated to a candidate node (which can include the candidate node) to automatically invite one or more other node to connect to the one or more certain node.

Authority 110 at block 1105 can return a decision that a succeeding engaged nodal network is a yet un-established prospective nodal network, but the selected prospective nodal network can have an associated candidate node in common with a candidate node currently functioning as a primary node. In such a scenario one or more output provided at block 1107 can include one or more output to generate an established nodal network (e.g. to initiate one or more connection invite) but can be absent of one or more output to transition the current primary node.

At block 1108, authority 110 can perform examining of a performance of a most recently engaged nodal network in the performance of tasks of a collaborative work project. For performing such examining, authority 110 can count a number of tasks that have been successfully completed during the most recent engagement. For performing such examining, authority 110 can count a percentage of tasks that have been successfully completed during the most recent engagement out of tasks that have been attempted. The value of a performance score parameter can be returned based, e.g., on the rate of task performance, e.g., tasks divided by the time period of the engagement and can be weighted by the difficulty of the tasks.

At block 1109, authority 110 can perform machine learning training to training various predictive models by methods that involve use of machine learning. Authority 110 can return a predicted performance score using Eq. 1 for each candidate node NA-NZ and can return the candidate node NA-NZ having the highest predicted performance score as the target entering node of a handover transition.

Authority 110 can be provided by one or more computing nodes. It can be regarded as a candidate node of a blockchain network that has access to ledger 120, a copy of which can be stored in a database at A associated to authority 110.

Authority 110 at block 1109 can perform machine learning training of various predictive models that can be used by authority 110 in the performance of various processing performed by authority 110. On completion of block 1109 authority 110 at block 1110 can return to block 1101.

Figure 7:
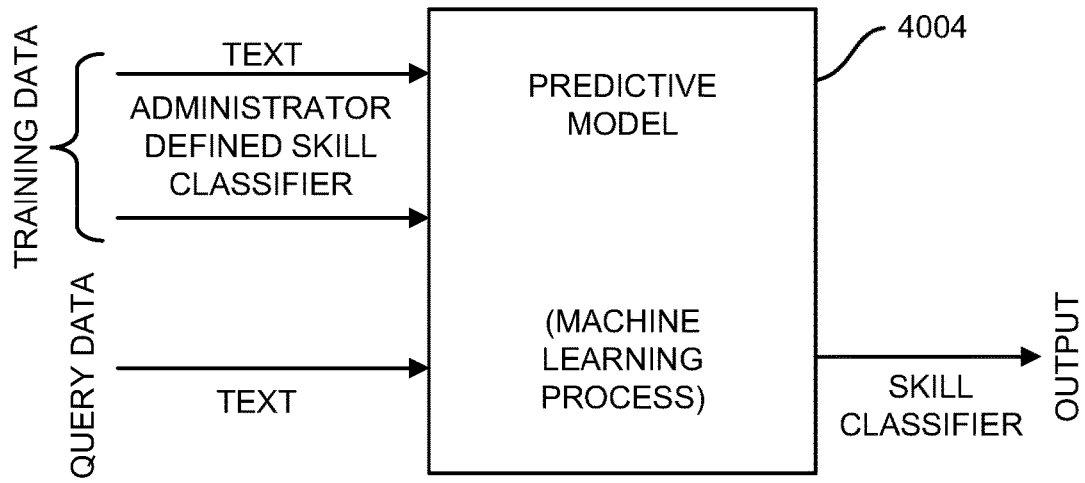
FIG. 7-10 depict training and use of various predictive models by machine learning according to various embodiments.

Authority 110 can use predictive model 4004 as depicted in FIG. 7 for return of skill topic classifier labels associated with text of an ongoing work project. Predictive model 4004 can be trained with use of machine learning process 117. Predictive model 4004 can be subject to training with use of training data as depicted in FIG. 7 which is iteratively input into predictive model 4004 for training. Training data can include segments of text from a work project file, e.g. a blog as shown in Table A, accompanied by administrator defined skill topic classifier data associated with the text. For example, with reference to Table A, work project data such as the blog as shown in Table A, can be iteratively generated throughout the course of deployment of system 100. An initial set of text based blog data can be manually tagged by administrator action, e.g. with use of an administrator user interface. The administrator tagged data can be applied as training data to the predictive model 4004. Segments of text can be applied as training data in associated with administrator defined text skill topic classifiers for the text segments. Table B depicts code for use in training predictive model 4004 for use in return of skill topic classifiers for entered text.

TABLE B

Support Vector Machine
loss_fun='huber'
classifier_svm_none = Pipeline([('vect', CountVectorizer( )),
    ('tfidf', TfidfTransformer( )),
    ('clf', SGDClassifier(loss=loss_fun, penalty='none',
        alpha=1e-3, n_iter=5, random_state=42)), ])
_ = classifier_svm_none.fit(X_train, y_train)

After an initial training of predictive model 4004, predictive model 4004 can be configured to be responsive to query data. The query data can include unlabeled segments of text. The query data can be presented to predictive model 4004 and once trained, predictive model 4004 can return an output. The output being an automated skill topic classifier label applied to the text data. Early on in the deployment of system 100 the skill topic classifier labels depicted in Table A can be manually applied, but after training performed by machine learning of predictive model 4004, predictive model 4004 can automatically generate such labels.

Over the course of deployment of system 100, an administrator user can continue to refine the performance of predictive model 4004. For example, a displayed user interface for use by an administrator user can include controls that allow a user to manually label new terms, which the administrator user believes, e.g. may be previously unencountered and difficult for predictive model 4004 to generate an accurate prediction of a skill topic classifier. Thus, in spot instances an administrator user is able to manually label select terms, e.g. text terms of a blog at the option of the administrator user. After an initial main training session, e.g. at the onset of deployment of system 100 predictive model 4004 can be continued to be subject to training data in spot instances. Using training data derived in the described situation where an administrator user optionally defines manually defined skill topic classifier labels for certain terminology, e.g. terms that an administrator user regards as terms newly introduced to system 100.

Figure 8:
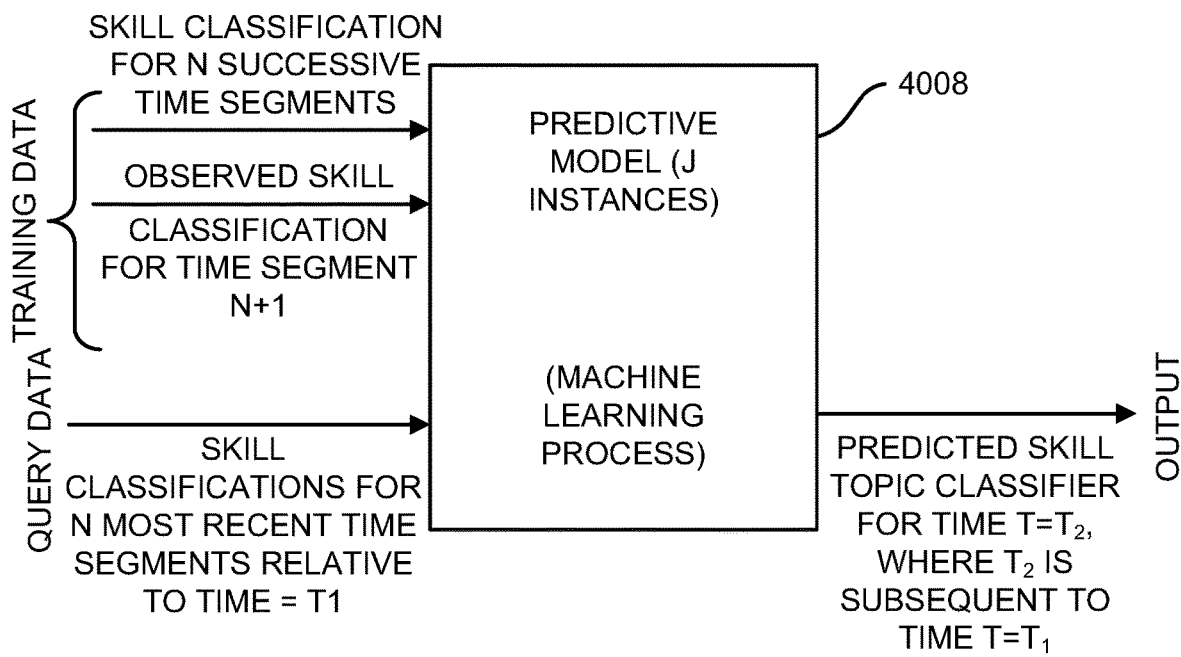

FIG. 8 depicts a predictive model 4008 for use in returning predictions of future skill topic classifiers associated to an ongoing work project. As set forth in reference to block 1101, authority 110 can predict a skill topic classifier for a work project at a certain future time, e.g. a preset future time, rather than return a skill topic classifier for a current time. Embodiments herein recognize that it can be advantageous for authority 110 to manage a "warm transfer".

Predictive model 4008 as depicted in FIG. 8 can facilitate return of a predicted future skill topic classifier that specifies a predicted future skill topic classifier at a certain future time that is a time in the future in relation to a current time. Predictive model 4008 can return a predicted skill topic classifier for time $T=T_2$ where $T_2$ is subsequent to time $T=T_1$. For training of predictive model 4008, authority 110 can perform machine learning by application of training data to predictive model 4008. The applied training data applied to predictive model 4008 can include training data that specifies a relationship between classifications during certain sequences of time in relation to observed skill topic classifications subsequent to the sequence of end time segments.

By application of the training data predictive model 4008 can learn trends of skill topic classifications that are in dependence on prior skill topic classifications. Predictive model 4008 is able to learn a trend wherein for example, a pattern wherein a second skill topic classification is expected to follow a sequence of first and second skill topic classifications according to a certain timing pattern.

Training data applied to predictive model 4008 can include skill topic classifications for N successive time segments and observed skill topic classification for time segment N+1. With the presence of the observed skill topic classification and the training data, predictive model 4008 defines a predictive model that is trained by supervised learning. Predictive model 4008, once trained, can be responsive to query data. The query data can include skill topic classifications for N most recent time segments relative to the current time $T=T_1$. Based on the training of predictive model 4008, predictive model 4008 is able to return output data in response to the received query data. The output data can include a predicted skill topic classifier for time $T=T_2$ where $T_2$ is subsequent to the current time $T=T_1$. $T_2$ can be subsequent to $T_1$ by a certain delay period, e.g. a preset delay period that is selected by an administrator user. The delay period can be selected so that the predicted skill topic classifier is associated to a time subsequent to the scheduled transition time that can be scheduled at deciding block 1105. Thus, a selected targeted entering node to which an access right can be handed off can have skill attributes matched the predicted skill topic classifier for the examined ledger 120 for a specific future point in time. Authority 110 can train and use J instances of predictive model 4008. For example, authority 110 can instantiate an instance of predictive model 4008 for each of J classifications of collaborative work projects being facilitated by authority 110.

Figure 9:
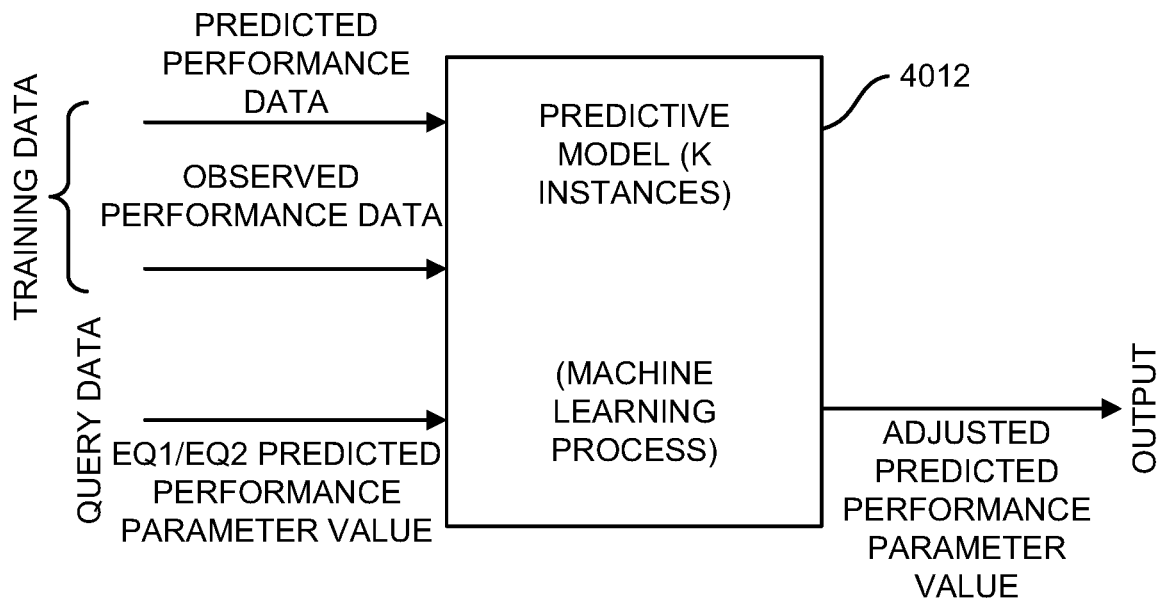

FIG. 9 depicts predictive model 4012 that can be used by authority 110 to return a refined prediction of performance of a candidate nodes NA-NZ being examined for identification as a target node in a transition handoff facilitated by authority 110. Authority 110 as explained with reference to Eq. 1 can return a scoring parameter value that specifies a predicted performance of a candidate node NA-NZ if selected as a targeted entering node in a transition handoff. Further as explained in reference to block 1108, authority 110 can perform examining of engaged candidate nodes and their associated nodal networks, e.g. nodal networks 131A-131Z to return performance data specifying performance of the candidate node and its associated nodal network during the engagement.

Predictive model 4012 can be trained by machine learning to return an adjusted predicted parameter value that improves the return data of Eq. 2. Authority 110 can apply as training data to predictive model 4012 predicted performance data that is generated using Eq. 1 in combination with observed performance data, e.g. the performance data returned by the performance of performance examining block 1108. On being trained, predictive model 4012 is able to respond to query data.

The query data can include a predicted performance value returned by application of Eq. 1 herein and the returned output data returned by application of the query data can include an adjusted predicted performance value. Accordingly, an output of predictive model 4012 can be adjusted based on whether the applicable candidate node tends to overperform or underperform relative to its performance generated using Eq. 1. Authority 110 can instantiate K instances of predictive model 4012. For example, authority 110 can instantiate an instance of predictive model 4012 for each of K candidate nodes NA-NZ of system 100, each candidate node having an associated nodal network 131A-131Z.

Figure 10:
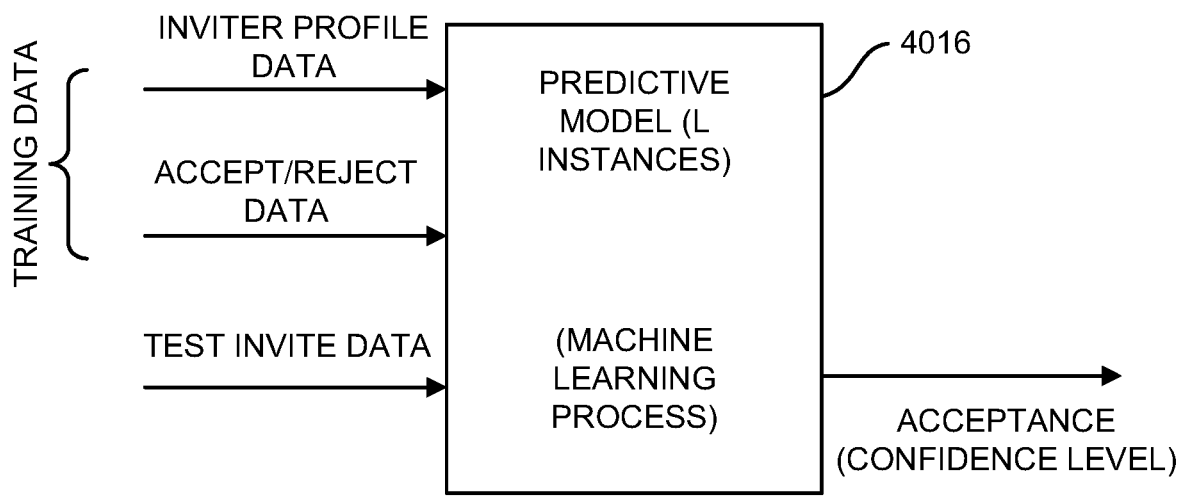

In FIG. 10 there is depicted a predictive model 4016 trained by machine learning for use in predicting a likelihood of a node accepting an invitation to join a social network from a certain inviter node, e.g., is explained in reference FIG. 5, inviter node NA can invite additional node AN2 (FIG. 4) to socially connect to node NA and as a result of an acceptance by node AN2, the social network comprising nodes AN2 and AN3 (FIG. 4) can become part of prospective nodal network 130A' (FIG. 5) which prospective nodal network 130A' (FIG. 5) can become an established existing nodal network on the acceptance of node AN2 to the described invitation by node NA. Referring to predictive model 4016, predictive model 4016 can be trained using training data which training data can include inviter profile data and accept reject data associated with prior instances of invites to a node. All instances of predictive model 4016 can be provided, e.g., once instance for each node of system 100.

Differently trained predictive models can be provided for each different node so that the set of trained predictive models 4016 accurately reflect differences in behavior among different users of the different nodes of system 100. Authority 110 can be iteratively apply training data to predictive model 4016. For example, can iteratively applied training data each time there is an invitation to connect to a node corresponding to the instance of predictive model 4016 and for each invite instance training data can also include the accept reject data associated with the invite instance specifying whether the invitation was accepted or rejected. Predictive model 4016 once trained can be configured to respond to query data. The query data can include a test invite provided by authority 110. For example, in determining factor F3 during the course of applying equation 2 as set forth herein. Authority 110 can apply test data to a predictive model for a node subject to a data examination to determine a probability that an invite to connect will be accepted by the node to thereby reconfigure a nodal network. In response to application of test invite data to predictive model 4016, predictive model can return acceptance data, e.g., in the form of a value of between 0.0 and 1.0 which indicates a confidence level that an invite will be accepted. The test invite data can include a profile of a prospective inviter node forming part of prospective nodal network being subject to examination for nodal network handoff. Predictive model 4016 can return acceptance data as noted on a scale of 0.0 to 1.0 so that higher values indicate a high likelihood of acceptance and lower values indicate a lower likelihood of acceptance. Based on training data applied to predictive model 4016, predictive model 4016 is able to accurate predict a likelihood of a node accepting an invite to thereby reconfigure a configuration of a nodal network.

Various available tools, libraries, and/or services can be utilized for implementation of predictive model 4004, 4008, and 4012. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Certain embodiments herein may offer various technical computing advantages involving computing advantages to address problems arising in the realm of computer networks. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence (AI) platforms, and machine learning platforms. Embodiments herein can employ data structuring processes, e.g. processing for transforming unstructured data into a form optimized for computerized processing. Embodiments herein can include particular arrangements for both collecting rich data into a data repository and additional particular arrangements for updating such data and for use of that data to drive artificial intelligence decision making. Embodiments herein can provide for intelligent handoff of access to a blockchain ledger from a first candidate node to a second candidate node. Applying artificial intelligence, handoff can be performed to that a succeeding engaged nodal network is well suited for performance of a mission referenced in a blockchain ledger. Features can include predicting a topic associated to a ledger at a specific point in time and selecting a succeeding nodal network for engagement to the blockchain ledger in dependence on a matching between a topic of the nodal network and a returned topic of the blockchain ledger. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 11:
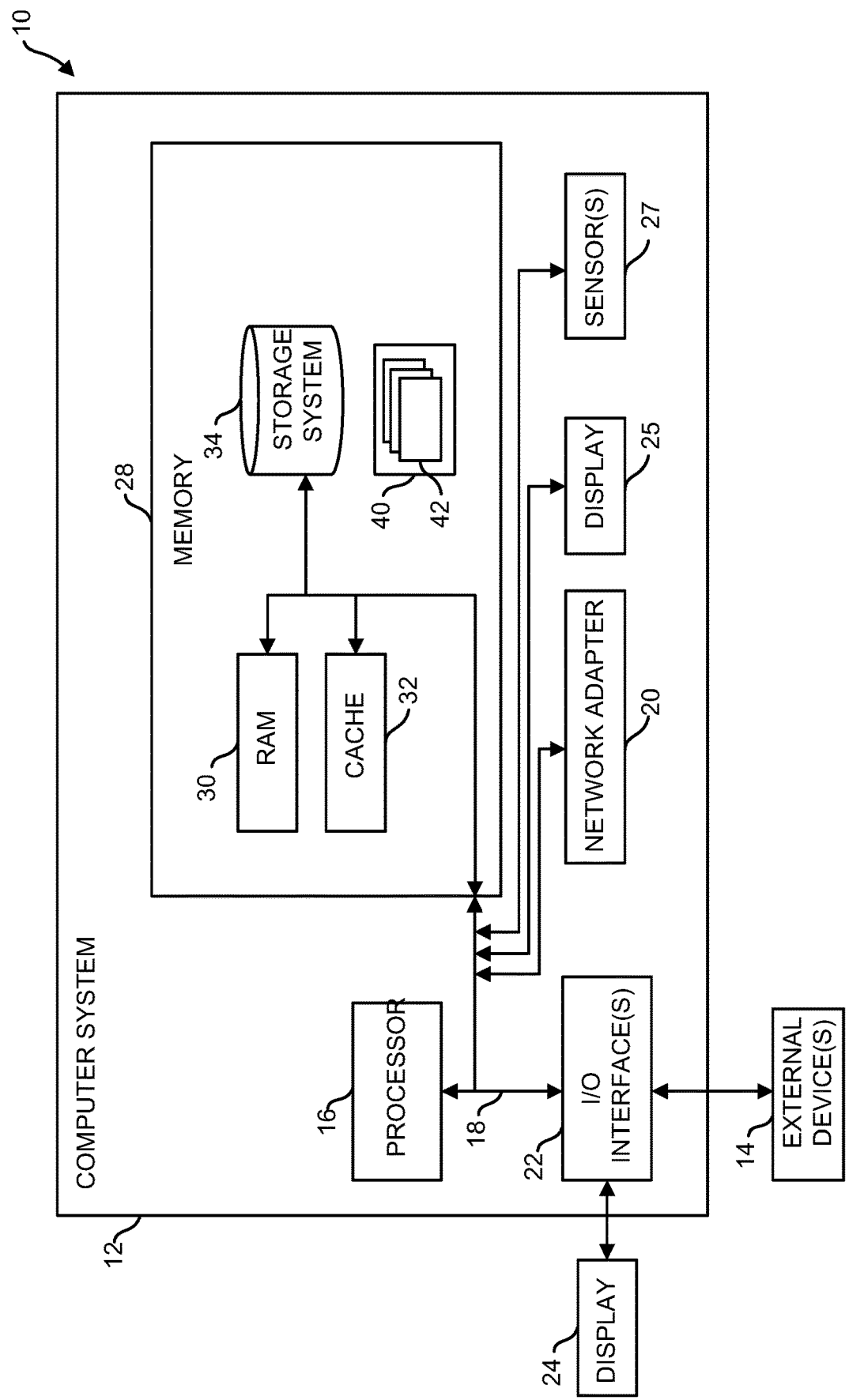
FIG. 11 depicts a computing node according to one embodiment.
Figure 12:
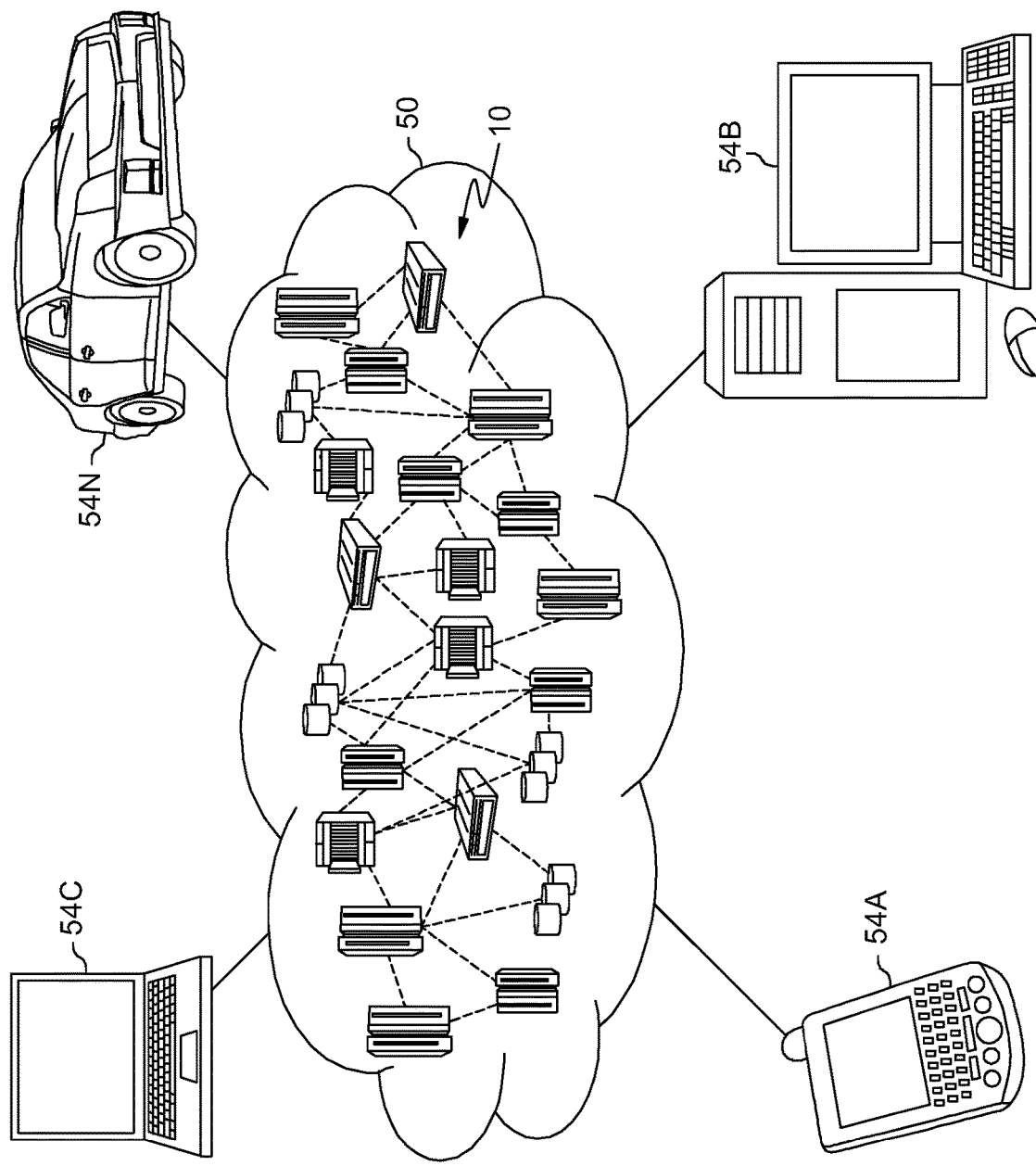
FIG. 12 depicts a cloud computing environment according to one embodiment.
Figure 13:
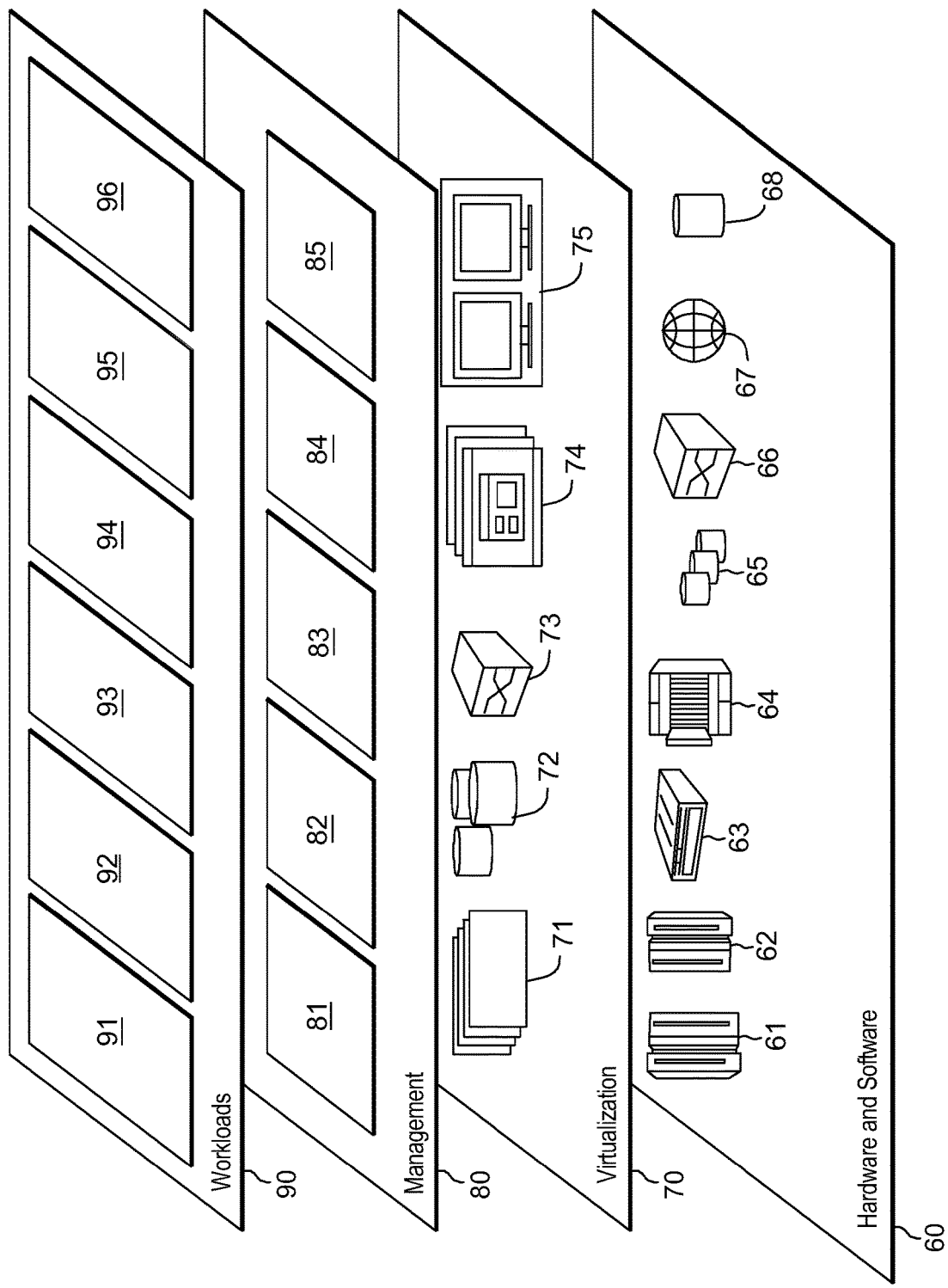
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, authority 110 can include one or more computing node 10 and can include one or more program 40 for performing functions described with reference to method 200 of FIG. 2 and functions described with reference to authority 110 as set forth in the flowchart of FIG. 3. In one embodiment, one or more candidate nodes N1-NZ can include one or more computing node 10 and can include one or more program 40 for performing functions described with reference to one or more candidate node N1-NZ as set forth in the flowchart of FIG. 3. In one embodiment, the computing node based systems and devices depicted in FIG. 1 can include one or more program 40 for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for intelligent ledger access transfer as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   examining ledger data of a blockchain ledger;
   examining node data of a plurality of candidate nodes, wherein the examining node data includes examining data of candidate nodal networks associated to respective ones of the plurality of candidate nodes; and
   transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes, wherein the ledger data specifies transaction of a collaborative work project being performed, and wherein the method includes predicting, based on the examining ledger data, a skill topic classification of the collaborative work project at a future point in time occurring after a perceivable delay with respect to a current time, and wherein the transitioning is performed in dependence on the predicting.

2. The method of claim 1, wherein the examining ledger data includes performing natural language processing of text based data of a ledger data to return a topic classification of the ledger data, and wherein examining ledger data includes examining ledger data to return a predicted topic classification of the ledger data at a future time perceivably delayed by a delay time relative to a current time.

3. The method of claim 1, wherein the ledger data specifies transactions of a collaborative work project being performed, wherein the method includes providing one or more output to reconfigure a nodal network associated to the second candidate node of the plurality of candidate nodes in dependence on the examining of the ledger data and in dependence on the examining of the node data, and wherein the method is performed so that there is engaged for performance of a collaborative work project referenced in the blockchain ledger an established nodal network that is established by the providing one or more output to reconfigure the nodal network associated to the second candidate node.

4. The method of claim 1, wherein the candidate nodal networks associated to respective ones of the plurality of candidate nodes include existing nodal networks, and prospective nodal networks that can be prospectively generated, wherein the method includes providing one or more output to generate an established nodal network in accordance a prospective nodal network of the prospective nodal networks in dependence on the examining of the ledger data and in dependence on the examining of the node data.

5. The method of claim 1, wherein examining ledger data includes examining data that specifies transactions of a work project being performed, wherein candidate nodal networks associated to respective ones of the plurality of candidate nodes are respective social networks of the respective candidate nodes, wherein the transitioning blockchain ledger access includes providing one or more output to relegate access of a first node of the plurality of candidate nodes and providing one or more output to promote access of a second node of the plurality of candidate nodes.

6. The method of claim 1, wherein the candidate nodal networks associated to respective ones of the plurality of candidate nodes define social networks, and wherein the candidate nodal networks associated to respective ones of the plurality of candidate nodes include existing nodal networks, and prospective nodal networks that can be prospectively generated, wherein the method includes providing one or more output to generate an established nodal network in accordance a prospective nodal network of the prospective nodal networks, and wherein the providing one or more output to generate the established nodal network is performed in dependence on the examining of the ledger data and in dependence on the examining of the node data, and wherein the providing one or more output to generate the established nodal network includes providing one or more output to initiate an invitation by a certain node of an existing nodal network to another node to socially connect to the certain node of the existing nodal network.

7. The method of claim 1, wherein the examining node data of the plurality of candidate nodes includes examining social network data of the plurality of candidate nodes.

8. The method of claim 1, wherein the ledger data of the blockchain ledger includes data specifying actions of a work project, wherein the examining ledger data includes performing natural language processing of text based data of the ledger data to return a skill topic classification of the ledger data, wherein the method includes returning a predicted performance of respective nodal networks of candidate nodes of the plurality of candidate nodes, the returning including using a scoring function, wherein a returned score returned using the scoring function is in dependence on a matching between skill topic classification of edges of the respective nodal networks, and a skill topic classification of the ledger data, and wherein the examining node data of the plurality of candidate nodes includes examining social network data of the plurality of candidate nodes.

9. The method of claim 1, wherein the examining node data of the plurality of candidate nodes includes examining social network data of the plurality of candidate nodes, wherein the examining social network data includes examining skill topic classifications of a plurality of edges of the candidate nodal networks associated to respective ones of the candidate nodes, wherein the candidate nodal networks define social networks associated to respective ones of the plurality of candidate nodes.

10. The method of claim 1, wherein the examining node data of a plurality of candidate nodes includes examining social network data of the plurality of candidate nodes, the examining social network data including examining calendar availability data social network contacts of the plurality of candidate nodes.

11. The method of claim 1, wherein the plurality candidate nodes include candidate nodes of a blockchain network that includes the blockchain ledger, wherein the transitioning includes providing one or more output to relegate access of a first node of the plurality of candidate nodes to the blockchain ledger, and providing one or more output to promote access of a second one of the plurality of candidate nodes to the blockchain ledger.

12. The method of claim 1, wherein the examining ledger data includes performing natural language processing of text based data of a ledger data to return a topic classification of the ledger data, and wherein examining ledger data includes examining ledger data to return a predicted topic classification of the ledger data at a future time perceivably delayed by a delay time relative to a current time.

13. The method of claim 1, wherein the ledger data specifies transactions of a collaborative work project being performed, wherein the method includes providing one or more output to reconfigure a nodal network associated to the second candidate node of the plurality of candidate nodes in dependence on the examining of the ledger data and in dependence on the examining of the node data, and wherein the method is performed so that there is engaged for performance of a collaborative work project referenced in the blockchain ledger an established nodal network that is established by the providing one or more output to reconfigure the nodal network associated to the second candidate node.

14. The method of claim 1, wherein the candidate nodal networks associated to respective ones of the plurality of candidate nodes include existing nodal networks, and prospective nodal networks that can be prospectively generated, wherein the method includes providing one or more output to generate an established nodal network in accordance a prospective nodal network of the prospective nodal networks in dependence on the examining of the ledger data and in dependence on the examining of the node data.

15. The method of claim 1, wherein examining ledger data includes examining data that specifies transactions of a work project being performed, wherein candidate nodal networks associated to respective ones of the plurality of candidate nodes are respective social networks of the respective candidate nodes, wherein the transitioning blockchain ledger access includes providing one or more output to relegate access of a first node of the plurality of candidate nodes and providing one or more output to promote access of a second node of the plurality of candidate nodes.

16. The method of claim 1, wherein the examining node data of the plurality of candidate nodes includes examining social network data of the plurality of candidate nodes.

17. The method of claim 1, wherein the ledger data of the blockchain ledger includes data specifying actions of a work project, wherein the examining ledger data includes performing natural language processing of text based data of the ledger data to return a skill topic classification of the ledger data, wherein the method includes returning a predicted performance of respective nodal networks of candidate nodes of the plurality of candidate nodes, the returning including using a scoring function, wherein a returned score returned using the scoring function is in dependence on a matching between skill topic classification of edges of the respective nodal networks, and a skill topic classification of the ledger data, and wherein the examining node data of the plurality of candidate nodes includes examining social network data of the plurality of candidate nodes.

18. The method of claim 1, wherein the examining node data of the plurality of candidate nodes includes examining social network data of the plurality of candidate nodes, wherein the examining social network data includes examining skill topic classifications of a plurality of edges of the candidate nodal networks associated to respective ones of the candidate nodes, wherein the candidate nodal networks define social networks associated to respective ones of the plurality of candidate nodes.

19. The method of claim 1, wherein the plurality candidate nodes include candidate nodes of a blockchain network that includes the blockchain ledger, wherein the transitioning includes providing one or more output to relegate access of a first node of the plurality of candidate nodes to the blockchain ledger, and providing one or more output to promote access of a second one of the plurality of candidate nodes to the blockchain ledger.

20. A method comprising:
examining ledger data of a blockchain ledger;
examining node data of a plurality of candidate nodes, wherein the examining node data includes examining data of candidate nodal networks associated to respective ones of the plurality of candidate nodes; and
transitioning blockchain ledger access in dependence on the examining of the ledger data and in dependence on the examining of the node data, wherein the transitioning blockchain ledger access includes transitioning blockchain ledger access between a first candidate node and a second candidate node of the plurality of candidate nodes, wherein the candidate nodal networks associated to respective ones of the plurality of candidate nodes define social networks, and wherein the candidate nodal networks associated to respective ones of the plurality of candidate nodes include existing nodal networks, and prospective nodal networks that can be prospectively generated, wherein the method includes providing one or more output to generate an established nodal network in accordance a prospective nodal network of the prospective nodal networks, and wherein the providing one or more output to generate the established nodal network is performed in dependence on the examining of the ledger data and in dependence on the examining of the node data, and wherein the providing one or more output to generate the established nodal network includes providing one or more output to initiate an invitation by a certain node of an existing nodal network to another node to socially connect to the certain node of the existing nodal network.

\* \* \* \* \*